United States Patent
Jenkins et al.

(10) Patent No.: US 9,264,535 B2
(45) Date of Patent: Feb. 16, 2016

(54) TECHNIQUES FOR TELECOMMUNICATIONS CONTACT MANAGEMENT ON AN END USER DEVICE

(71) Applicant: Bandwidth.com, Inc., Raleigh, NC (US)

(72) Inventors: Jackie Jenkins, Dexter, MI (US); Brad Roldan, Sunnyvale, CA (US)

(73) Assignee: Bandwidth.com, Inc., Raleigh, NC (US)

( * ) Notice: Subject to any disclaimer, the term of this patent is extended or adjusted under 35 U.S.C. 154(b) by 0 days.

(21) Appl. No.: 14/714,643

(22) Filed: May 18, 2015

(65) Prior Publication Data

US 2015/0249740 A1    Sep. 3, 2015

Related U.S. Application Data

(63) Continuation of application No. 14/699,529, filed on Apr. 29, 2015.

(51) Int. Cl.
| | |
|---|---|
| *H04M 1/56* | (2006.01) |
| *H04M 15/06* | (2006.01) |
| *H04M 1/00* | (2006.01) |
| *H04M 3/00* | (2006.01) |
| *H04M 3/42* | (2006.01) |
| *H04W 4/16* | (2009.01) |

(52) U.S. Cl.
CPC ............ *H04M 3/42042* (2013.01); *H04W 4/16* (2013.01)

(58) Field of Classification Search
CPC .............. H04M 1/27455; H04M 1/57; H04M 1/72529; H04M 2201/40; G06F 17/24
USPC .......... 379/88.12, 88.13, 88.19, 93.17, 93.23, 379/142.01, 142.06, 142.09, 142.17, 379/210.01, 354, 355.02, 355.09; 455/415, 455/418, 500, 517, 564, 566, 414.1
See application file for complete search history.

(56) References Cited

U.S. PATENT DOCUMENTS

| | | | | |
|---|---|---|---|---|
| 7,912,497 | B2 * | 3/2011 | Isidore et al. | 455/552.1 |
| 2009/0227242 | A1 * | 9/2009 | Lee et al. | 455/418 |
| 2010/0203923 | A1 * | 8/2010 | Kuhl et al. | 455/564 |
| 2015/0017962 | A1 * | 1/2015 | Howard | G04W 8/22 455/418 |

* cited by examiner

*Primary Examiner* — Binh Tieu
(74) *Attorney, Agent, or Firm* — Gregory Stephens

(57) ABSTRACT

Various embodiments are directed to techniques managing telephone numbers and other telecommunication identifiers when placing and receiving calls or messages from a single device. In some embodiments, one of a plurality of outbound telephone numbers or other identifiers associated with the device or an application executing on the device may be selected when making an outbound telephone call or sending a message. In another embodiment, an outbound telephone number or other identifier is automatically selected when making an outbound telephone call or sending a message based on an association of that outbound telephone number with the intended recipient of the call or message.

9 Claims, 12 Drawing Sheets

300

600

700

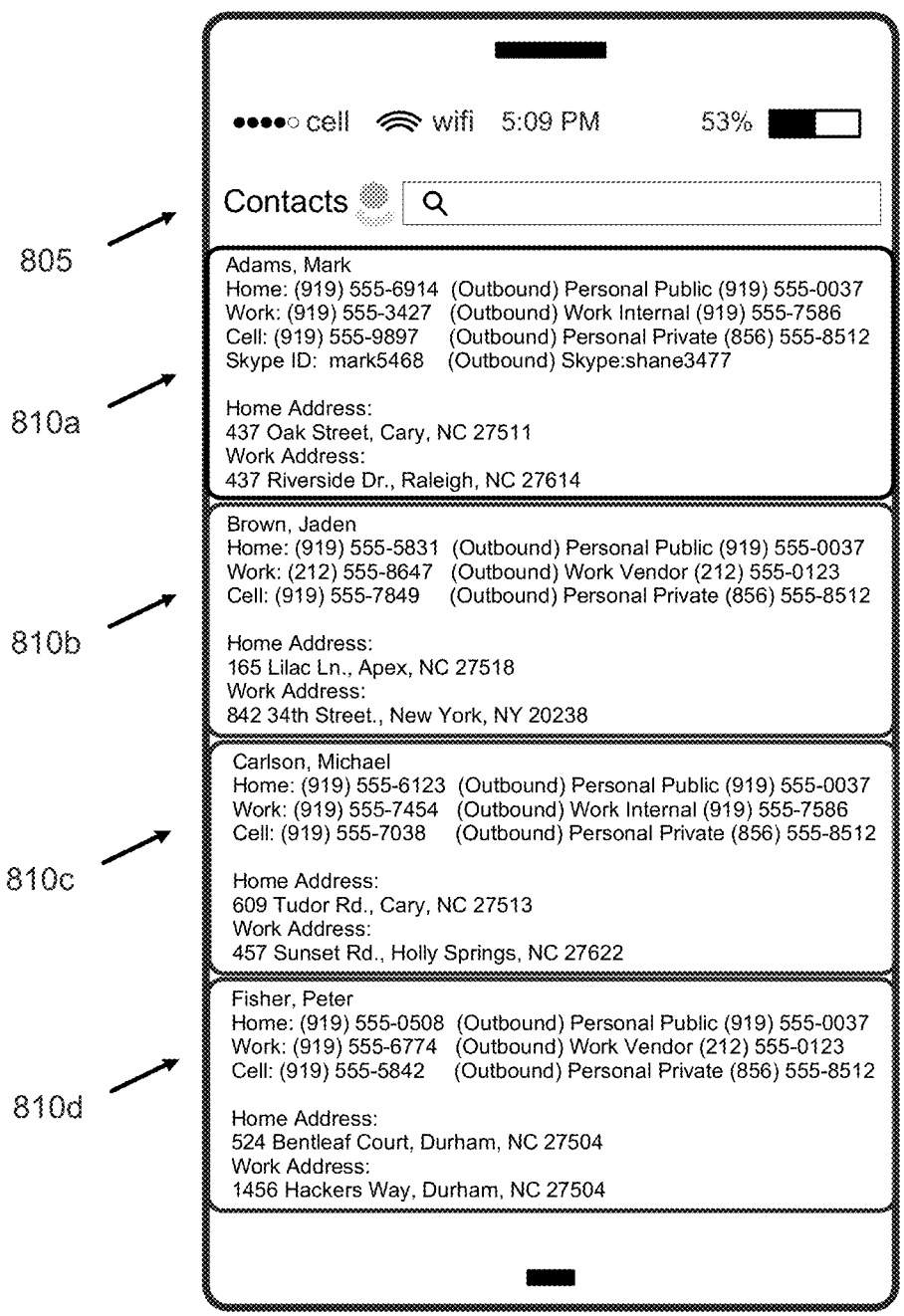

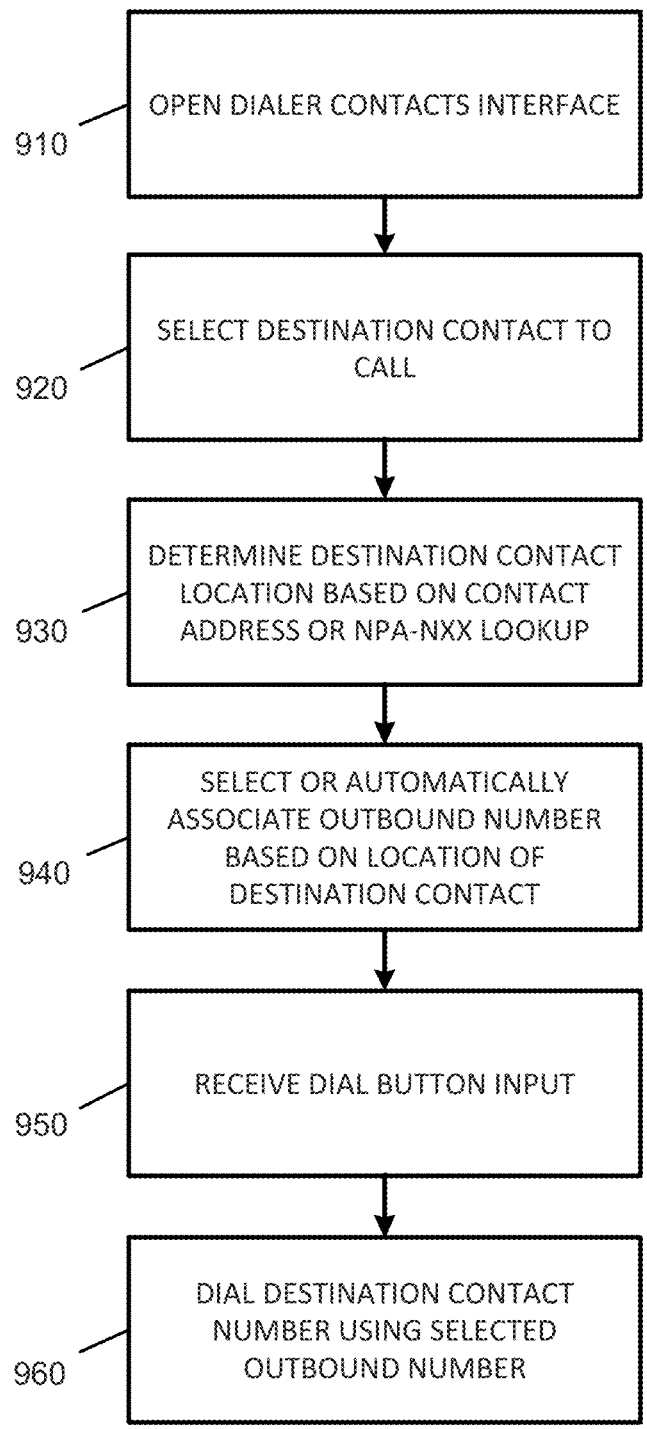

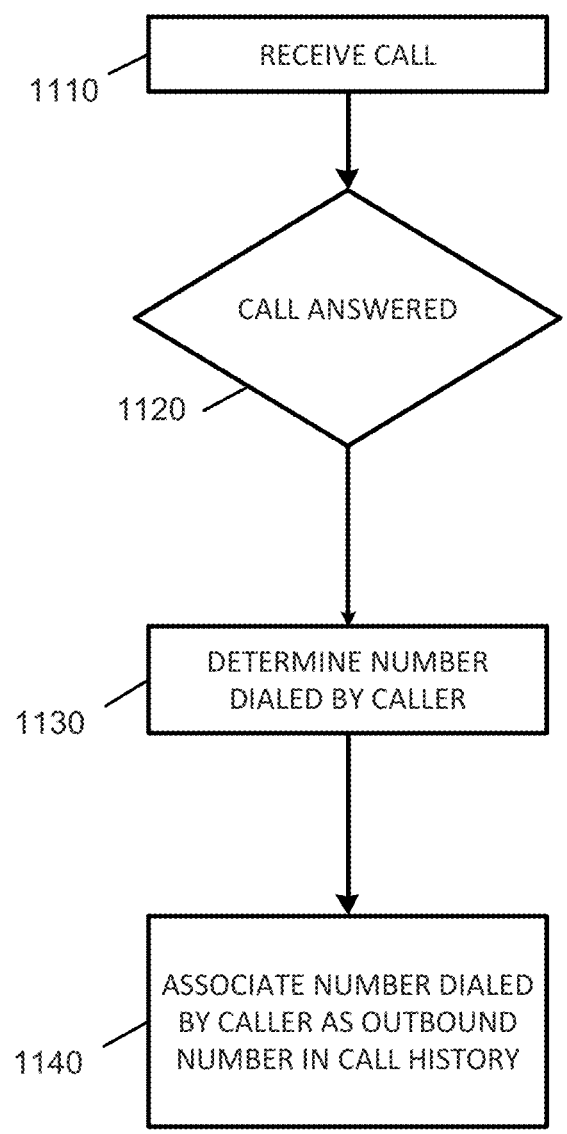

TECHNIQUES FOR TELECOMMUNICATIONS CONTACT MANAGEMENT ON AN END USER DEVICE

CROSS REFERENCE TO RELATED APPLICATIONS

This application is a continuation of pending U.S. application Ser. No. 14/699,529 filed Apr. 29, 2015 entitled "TECHNIQUES FOR TELECOMMUNICATIONS CONTACT MANAGEMENT ON AN END USER DEVICE".

TECHNICAL FIELD

Examples described herein are generally related to techniques for placing telephone calls using one of a plurality of outbound telephone numbers.

BACKGROUND

People often have multiple phone numbers that may be associated with a single device. For example, some mobile phone applications can accommodate multiple user phone numbers on the same device. One example of such an application is RingTo™ developed by Bandwidth.com, Inc. RingTo™ may be executed on Apple™ IOS platforms and Android™ platforms and allows users to port one or more telephone numbers to a cloud based server. These telephone numbers may be used to make outgoing telephone calls and receive incoming telephone calls on Apple™ IOS or Android™ devices executing the RingTo™ application.

While users appreciate access to multiple telephone numbers on a single device, especially for incoming calls, it can be problematic to track which of the telephone numbers to use when making an outbound call. For example, a user may have both a personal telephone number and a business telephone number associated with the same device. When making a call for business purposes, the user prefers to use the business telephone number. Similarly, when making a personal call, the user prefers to use the personal telephone number.

What is needed is a mechanism that permits the user to select, on a per call basis, which telephone number of a plurality to associate with an outbound telephone call.

BRIEF DESCRIPTION OF THE DRAWINGS

FIG. 8 illustrates another example screen shot of a contacts user interface of a mobile phone according to an embodiment of the invention.

FIG. 9A illustrates a third logic flow diagram according to an embodiment of the invention.

FIG. 11 illustrates a fifth logic flow diagram according to an embodiment of the invention.

DETAILED DESCRIPTION

Individual users or subscribers often have multiple telephone numbers at which they can be reached. Often these numbers are segregated functionally and may be associated with different types of callers that dial these numbers. For instance, a user may have a home telephone number, a work telephone number, and a cellular telephone number. Additionally, the user may have more than one work telephone number or more than one personal telephone number. For convenience, the user may wish to manage all (or some subset) of these numbers from a single device—preferably a mobile device. This is possible using, for instance, an over-the-top (OTT) telephony application executing on a mobile device. One such OTT application is RingTo™ developed by Bandwidth.com, Inc. The RingTo™ application allows a user to allocate multiple numbers to a cloud based platform. Each of these numbers may then be used to place or receive telephone calls on the mobile device. However, this ability makes number management for the user slightly more complicated.

For instance, the user would like to know which of his/her telephone numbers was used by a caller on an incoming call. This provides an initial degree of context letting the user know if the call is personal or work related. More granularly, the user may control who knows about which phone number thereby giving the user a high degree of confidence as to the caller or the caller's intent even if the Caller ID information is unfamiliar to the user.

Similarly, the user may wish to associate a particular phone number (outbound telephone number) when dialing out to another party. For example, the user may wish to associate an office number for work related calls and a personal number for calls to friends and family. Moreover, work and personal telephone numbers may be further segregated as public and private meaning the number of people or contacts that know a particular number may be limited by the user.

In one embodiment, the user may manually and dynamically associate one of their outbound telephone numbers with a call they are about to place. In another embodiment, the device may automatically associate an outbound telephone number based on the number dialed or contacted selected. This requires that an outbound telephone number be associated with a contact such that the telephony server may automatically insert the proper Caller ID information for the outgoing call. In yet another embodiment, the user may automatically associate an outbound telephone number for an existing or new contact based on the telephone number used by the caller to reach the user. These embodiments are described with reference to the figures herein.

Figure 1:
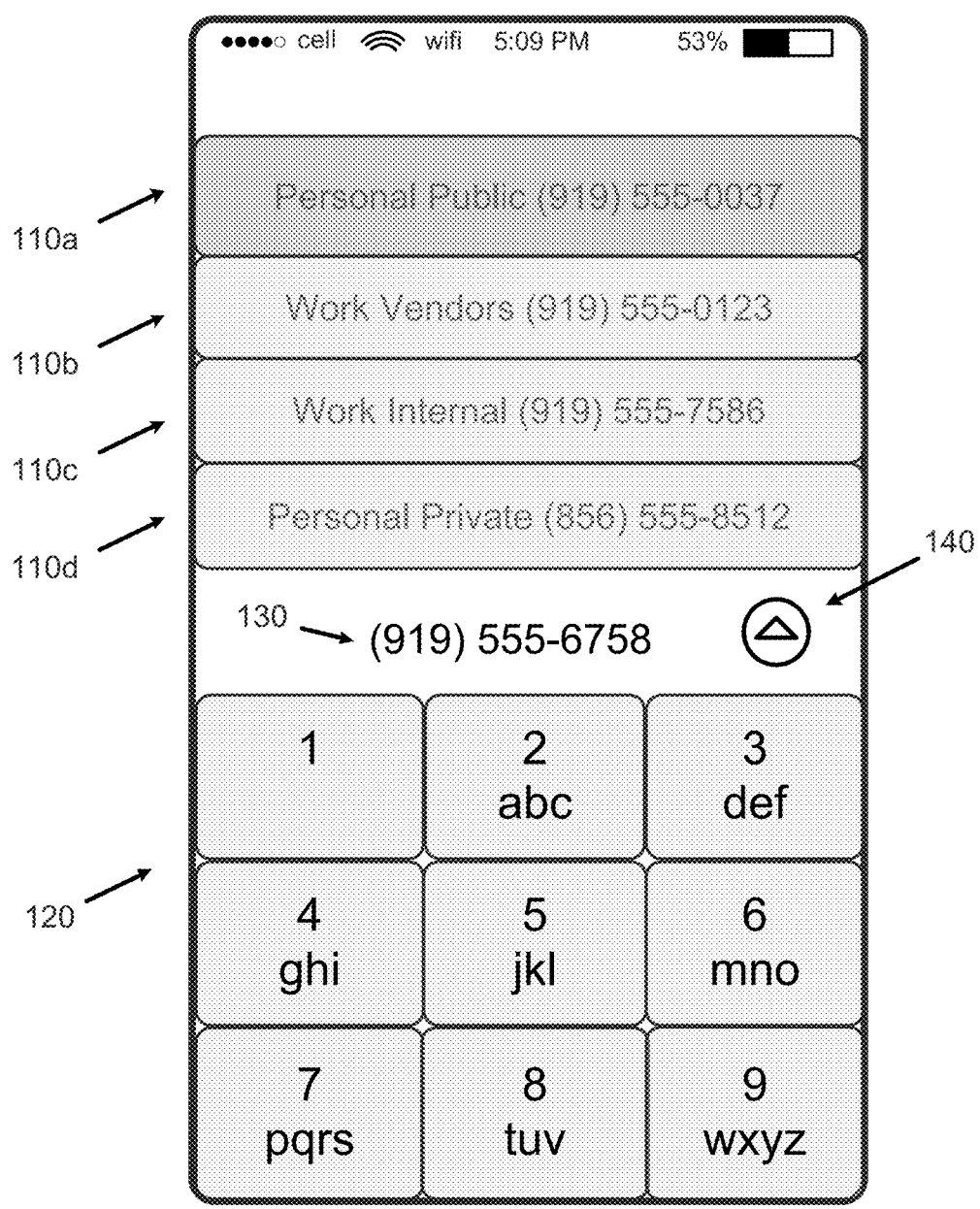
FIG. 1 illustrates an example screen shot of a dialer user interface of a mobile phone according to an embodiment of the invention.

FIG. 1 illustrates an example screen shot 100 of a user interface of a mobile device according to an embodiment of the invention. In this embodiment, a typical top row of persistent information is provided to the user of a mobile device including cellular and wifi (e.g., 802.11) signal strength, time, and remaining battery level. The next four (4) lines illustrate that user's outbound telephone numbers 110*a-d* associated with the device and/or application executing on the device. In this example, the user has four (4) separate telephone numbers all manageable under a single application. These outbound telephone numbers include (i) a personal public telephone number of (919) 555-0037, (ii) a work vendors telephone number of (212) 555-0123, (iii) a work internal telephone number of (919) 555-7586, and (iv) a personal private telephone number of (856) 555-8512. The personal public telephone number may be reserved for or given out to people generally that are not associated with work. The work vendors telephone number may be reserved for or given out to vendors associated with the user's work. The work internal telephone number may be reserved for or given out to co-workers generally. Lastly, the personal private telephone number may be reserved for or given out to a smaller group of friends and/or family. By segregating the telephone numbers as described above, the user can give and receive context when making or receiving a telephone call based on the telephone number called on an incoming call or the telephone number used for an outbound telephone call. The number of telephone numbers and their associated labels are illustrative only and should not be considered as limiting the embodiments of the invention in any way. The labels may include a default set provided by the contact management application developer and may further include an ability to allow a user to create his/her own labels. One of ordinary skill in the art could readily devise different labels for the telephone numbers as well as have more or less telephone numbers. For instance, the user may have an additional number associated with work customers. Moreover, very important customers or personal contacts may even warrant their own telephone number.

Below the listing of outbound telephone numbers 110*a-d* is a typical numeric keypad 120 that may be used to dial a desired number for an outbound call. Just above the keypad 120 is an information line that illustrates the number dialed 130. In this case, the number dialed 130 is (919) 555-6758. Just to the right of the number dialed 130 is a call button 140. The call button 140 is engaged by the user to initiate a call to the number dialed 130. Prior to initiating a call to the number dialed 130, the user may select one of the four (4) outbound telephone numbers 110*a-d* to be used as the calling party telephone number. This is the telephone number that will appear on the recipient's Caller ID interface. In this example, the user has selected his/her personal public telephone number 110*a* as indicated by the darker shading on screen shot 100. The user may engage with this interface via typical touch screen technology well known in the art. Additionally, the specific layout of screen shot 100 is illustrative. One of ordinary skill in the art could re-arrange the components shown in the screen shot 100 of FIG. 1 without altering the functionality represented by the screen shot 100.

Figure 2:
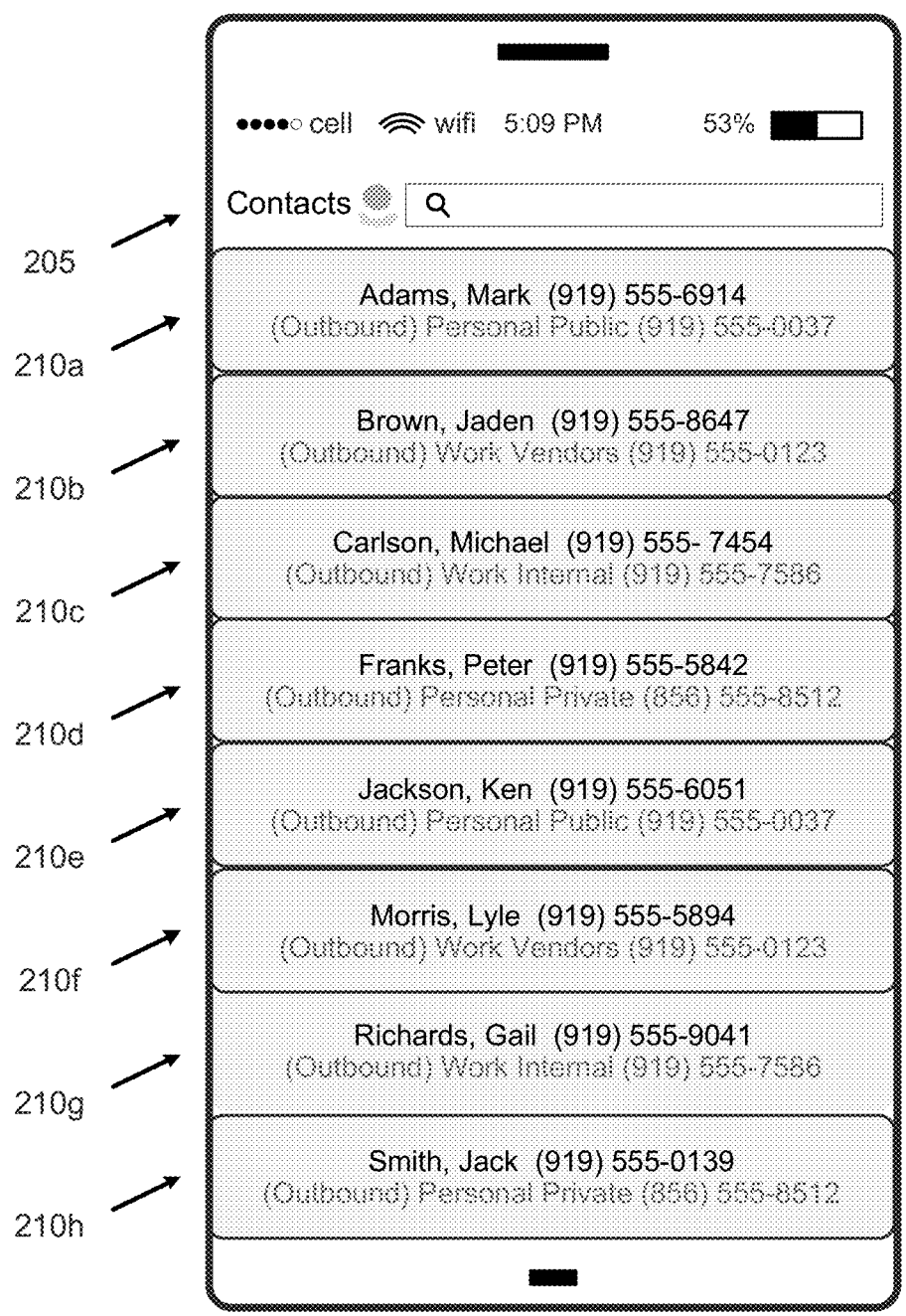
FIG. 2 illustrates an example screen shot of a contacts user interface of a mobile phone according to an embodiment of the invention.

FIG. 2 illustrates an example screen shot 200 of a contacts user interface of a mobile phone according to an embodiment of the invention. Just as in FIG. 1, a typical top row of persistent information is provided to the user of a mobile device including cellular and wifi (e.g., 802.11) signal strength, time, and remaining battery level. Just below the persistent information data is a contacts search line 205 that invites the user to search for a specific contact. The remainder of the screen shot 200 is occupied by a listing (alphabetical in this example) of contacts 210*a-h*. The name and primary telephone number for each contact is shown on the first line for that contact while a particular outbound user number may be associated on the second line. For instance, contact 210*a* displays the name "Adams, Mark" along with a telephone number (919) 555-6914 on the first line. On the second line is an associated outbound telephone number that is one of the user's own telephone numbers. In this instance, the outbound telephone number is (919) 555-0037. Moreover, the outbound telephone number has been further associated with a label—"Personal Public". The user configurable labels may further identify the category of people the user wishes to associate with a particular telephone number. Based on the "Personal Public" label, one may infer that this contact may be a personal acquaintance of the user. The contact is likely not work related since none of the work related labels have been associated with the contact. Nor has this contact been elevated to what is likely a smaller group of people (e.g., family and close friends) under the label "Personal Private".

The next entry 210 *b* in the contact list is for Brown, Jaden whose telephone number is (212) 555-8647. The associated outbound telephone number for Brown, Jaden is labeled as "Work Vendors" and is (212) 555-0123. This outbound number has likely been created by the user to be used for communicating with a specific type of work related client. Incoming calls to this telephone number provide an immediate context to the user even before the call is answered.

Similar explanations may be presented for contact entries 210*c-h*. Each of these contact entries has an associated outbound telephone number that will be used when calling that contact. In this manner, the user can segregate his contacts in a logical manner.

The specific layout of screen shot 200 is illustrative especially since the only information shown for a contact is their name and a single telephone number. One of ordinary skill in the art could re-arrange the components shown in the screen shot 200 of FIG. 2 without altering the functionality represented by the screen shot 200.

Figure 3:
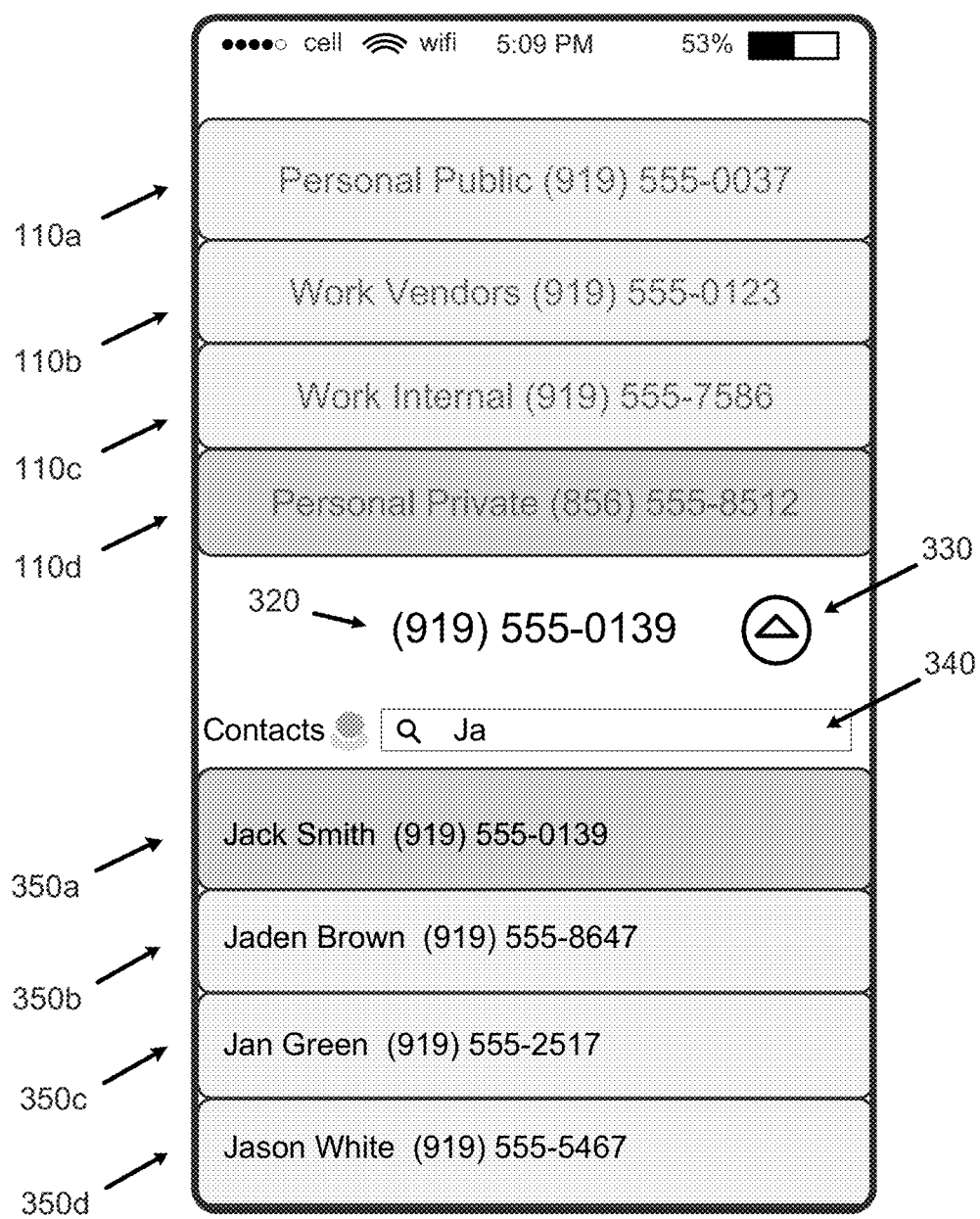
FIG. 3 illustrates an example screen shot of a dialer user interface of a mobile phone according to another embodiment of the invention.

FIG. 3 illustrates an example screen shot 300 of a dialer user interface of a mobile phone according to another embodiment of the invention. The screen shot 300 still shows the top row of persistent information. Just below that top row is a listing of the user's telephone numbers 110*a-d* usable with the device. These telephone numbers may also be referred to as outbound telephone numbers but are also capable of receiving incoming calls. In this example, the user has four (4) separate telephone numbers 110*a-d* each associated with a distinct label—Personal Public, Work Vendors, Work Internal, and Personal Private. As stated earlier, the labels and number of telephone numbers is illustrative only and may be different for different users.

Below the listing of outbound telephone numbers 110*a-d* is a space for displaying the telephone number 320 of a contact to be dialed. Next to that number is a call button 330 that may be engaged (e.g., via touchscreen) to place an outgoing call. Just below the telephone number 320 of the contact to be dialed is a search/text entry dialogue box 340 for allowing the user to search for a particular contact. In this case, the user has entered the letters "Ja" into the search box 340 causing the remainder of the screen below to display contacts 350*a-d* having "Ja" in the name field. The contacts 350*a-d* are typically displayed in alphabetical order. If the user were to input an additional letter to the current search string of "Ja", the resulting display of contacts 350*a-d* would be altered to reflect matches with the new search string.

This example also has one of the outbound telephone numbers 110*d* highlighted and one of the contact numbers 350*a* highlighted. The highlighted numbers indicate that the user has selected a contact to call and an outbound telephone number to use for the call. In this example, the user is calling Jack Smith 350*a* and will use his Personal Private outbound telephone number 110*d* to make the call. Once these selections are made, the device may fill in space for displaying the number to be called 320 and activate the call button 330 to await engagement by the user.

When combined with the information in the contacts database shown in FIG. 2, the dialer user interface 300 may have automatically selected the Personal Private outbound telephone number 110*d* because it has been pre-associated with this contact. The user may override this selection by selecting a different outbound telephone number 110*a-c* if desired. In this manner, the user is able to control what outbound telephone number is to be used for the telephone call.

Included herein is a set of flow charts and message diagrams representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
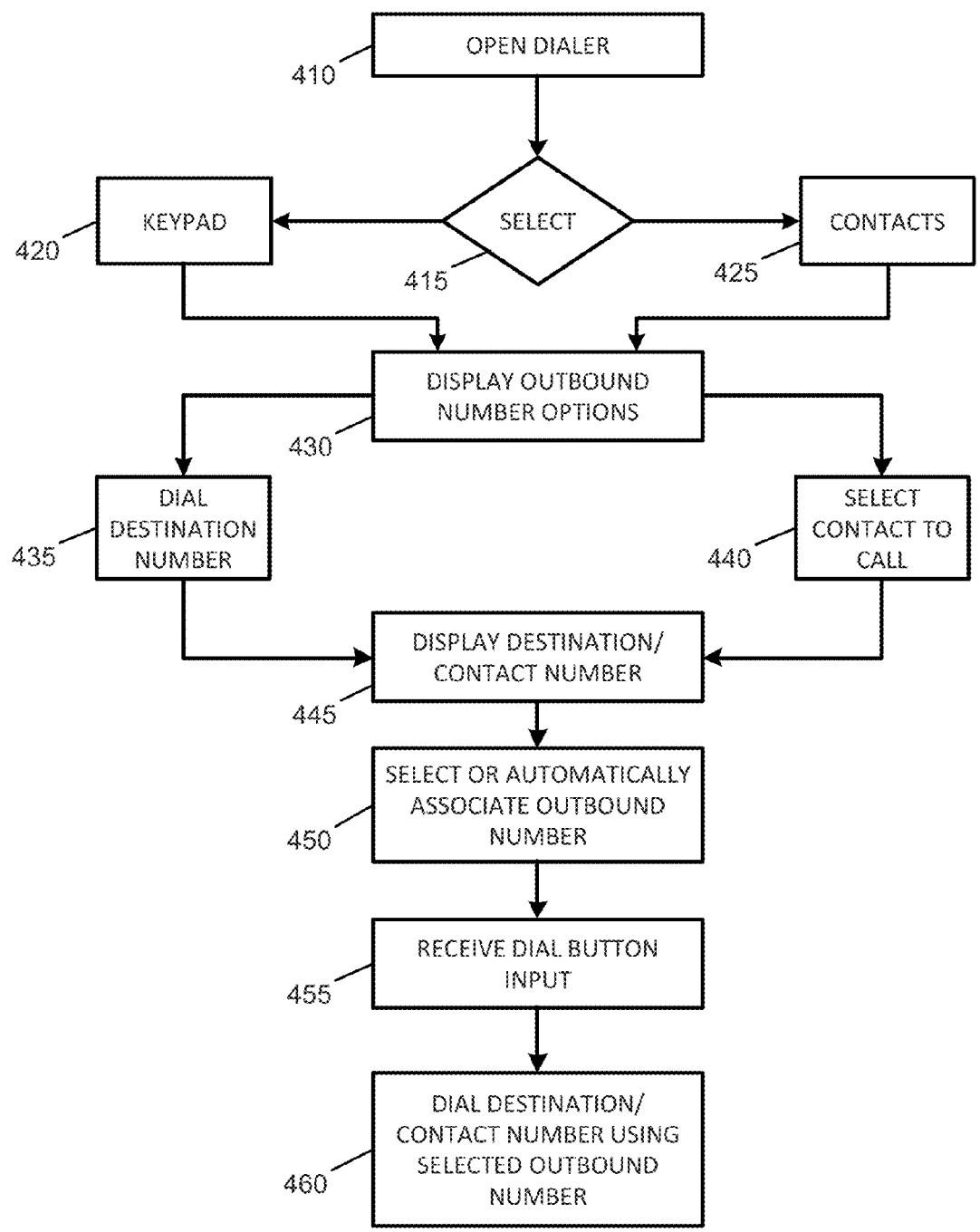
FIG. 4 illustrates a first logic flow diagram according to an embodiment of the invention.

FIG. 4 illustrates an example of a first logic flow. Logic flow 400 may be representative of some or all of the operations executed by one or more logic, features, or devices described herein, such as any devices, systems, methods and/or techniques described above with references to FIGS. 1-3 for example. More particularly, logic flow 400 may be implemented by logic of a mobile device and/or call server in some embodiments. In various embodiments, the logic flow 400 may be representative of some or all of the operations associated with receiving and/or placing a telephone call between two end users. Other embodiments are described and claimed.

FIG. 4 illustrates a first logic flow diagram 400 according to an embodiment of the invention. The logic flow 400 may be implementable by a mobile device capable of telephony communications over one or more networks (e.g., packet based or cellular). The mobile device includes requisite computer processor(s) capable of executing software representing a user interface for incoming and outgoing telephone calls. In this logic flow 400, a user interface for a dialer may be opened at block 410 for purposes of placing a call. The dialer user interface serves primarily to allow the user to place outbound telephone calls. For example, the result of block 410 may be an interface that allows the user to select at block 415 an interface having a keypad (block 420) as represented by FIG. 1 or a contacts list (block 425) as represented by FIG. 3. Upon making a selection, the user interface may display a plurality of outbound telephone number options at block 430. The plurality of outbound telephone number options correspond to the number of telephone numbers the user may utilize on the mobile device.

Depending on whether the user selected a keypad dialer interface (block 420) or a contacts dialer interface (block 425), the user will be prompted to dial a destination telephone number at block 435 or select a contact to call at block 440. If the user selected a keypad dialer interface (block 420), an interface like the one shown in FIG. 1 may be displayed. If the user selected a contacts dialer interface (block 425), an interface like the one shown in FIG. 3 may be displayed. Once the destination number has been dialed (block 435) or a contact has been selected (block 440), the destination number or contact number may be displayed at block 445 on the dialer interface. At this point, the user may be prompted to select, at block 450, a particular outbound telephone number from among the displayed outbound telephone number options from block 430. The selected outbound telephone number may then be associated with this telephone call. In some instances, the outbound telephone number to be associated with the destination number may already have been associated in the contacts database. In such cases, the associated outbound telephone number may be automatically selected for the call. The user may select an alternative outbound telephone number to override the association in the contacts database if desired also at block 450.

Once the outbound telephone number has been selected and associated with the call, the dialer interface awaits input to a dial button (e.g., ref. no. 140 in FIG. 1 or ref. no. 330 in FIG. 3) at block 455. Upon receiving input (e.g., engagement) to the dial button at block 455, the dialer interface will cause the mobile device to attempt to create a connection (e.g., place a telephone call) to the destination telephone number/contact using at least one appropriate telephony network available to the mobile device at block 460.

Figure 5:
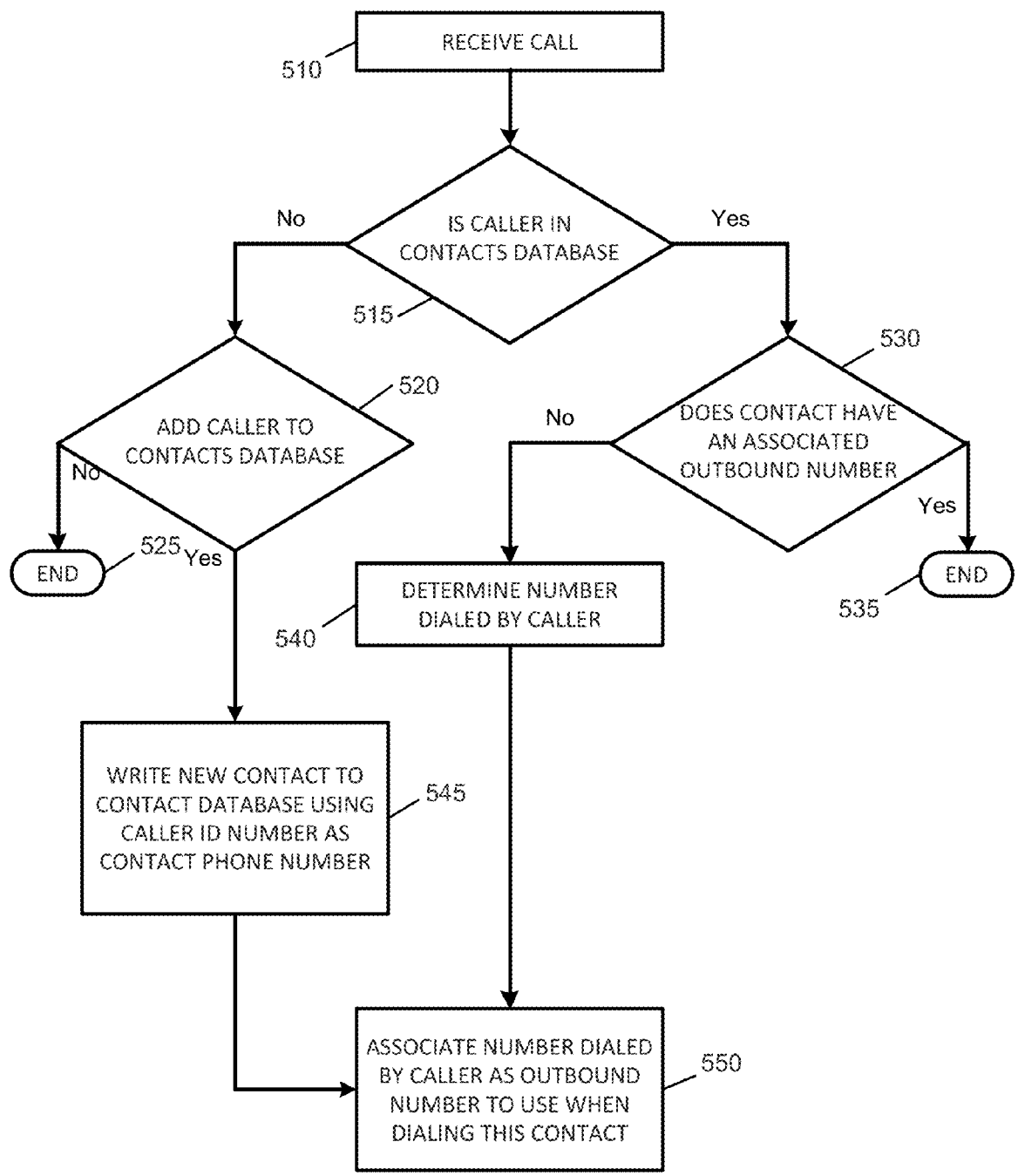
FIG. 5 illustrates a second logic flow diagram according to an embodiment of the invention.

FIG. 5 illustrates an example of a second logic flow. Logic flow 500 may also be representative of some or all of the operations executed by one or more logic, features, or devices described herein, such as any devices, systems, methods and/or techniques described above with references to FIGS. 1-3 for example. More particularly, logic flow 500 may be implemented by logic of a mobile device, computer soft client, and/or call server in some embodiments. In various embodiments, the logic flow 500 may be representative of some or all of the operations associated with receiving and/or placing a telephone call or SMS text/MMS message between two end users. Other embodiments are described and claimed.

FIG. 5 illustrates a second logic flow diagram 500 according to an embodiment of the invention. The logic flow 500 may be implementable by a mobile device and/or computer soft client capable of telephony communications over one or more networks (e.g., packet based or cellular). The mobile device and/or computer soft client includes requisite computer processor(s) capable of executing software representing a user interface for incoming and outgoing telephone calls and SMS text/MMS messages. In this logic flow 500, a user interface may be opened at block 510 for purposes of executing a contact management process upon receiving or answering a call. The logic flow 500 then determines whether the caller is already in a contacts database on the mobile device or in a cloud based contacts database associated with the user at block 515. If the caller is not already in a contacts database associated with the user, the logic flow 500 gives the user the option to add the current caller to the contacts database at block 520. If the user decides not to add the caller to their contacts database the contact management process ends at block 525 and the call is simply answered or rejected by the user. If the user decides to add the caller to their contacts database at block 520, an interface/process that writes the caller ID number into a new contact may be executed at block 545. Once the new contact has been created at block 545, one of the user's outbound telephone numbers may be associated with this contact. As a default, the number that the caller dialed to reach the user may be associated with the contact in the contact database at block 550. This makes the most sense since this is the number of the user that the caller knew to dial. An additional set of prompts may be executed to gather more information for the new contact including, but not limited to, name, company, address, email address, etc.

Referring back to the determination in block 520 whether the caller is already in a contacts database, if it is determined the caller is in a contacts database, the logic flow 500 will determine if the contact information includes an associated outbound telephone number at block 530. If it is determined there is an associated outbound telephone number for the contact, the contact management process may end at block 535. Otherwise, the logic flow 500 may determine the number dialed by the caller at block 540 which will be one of the user's outbound telephone numbers. The logic flow 500 may then associate this dialed number with the contact at block 550 such that when this contact is selected for a call, the associated outbound telephone number will be used for the call.

Figure 6:
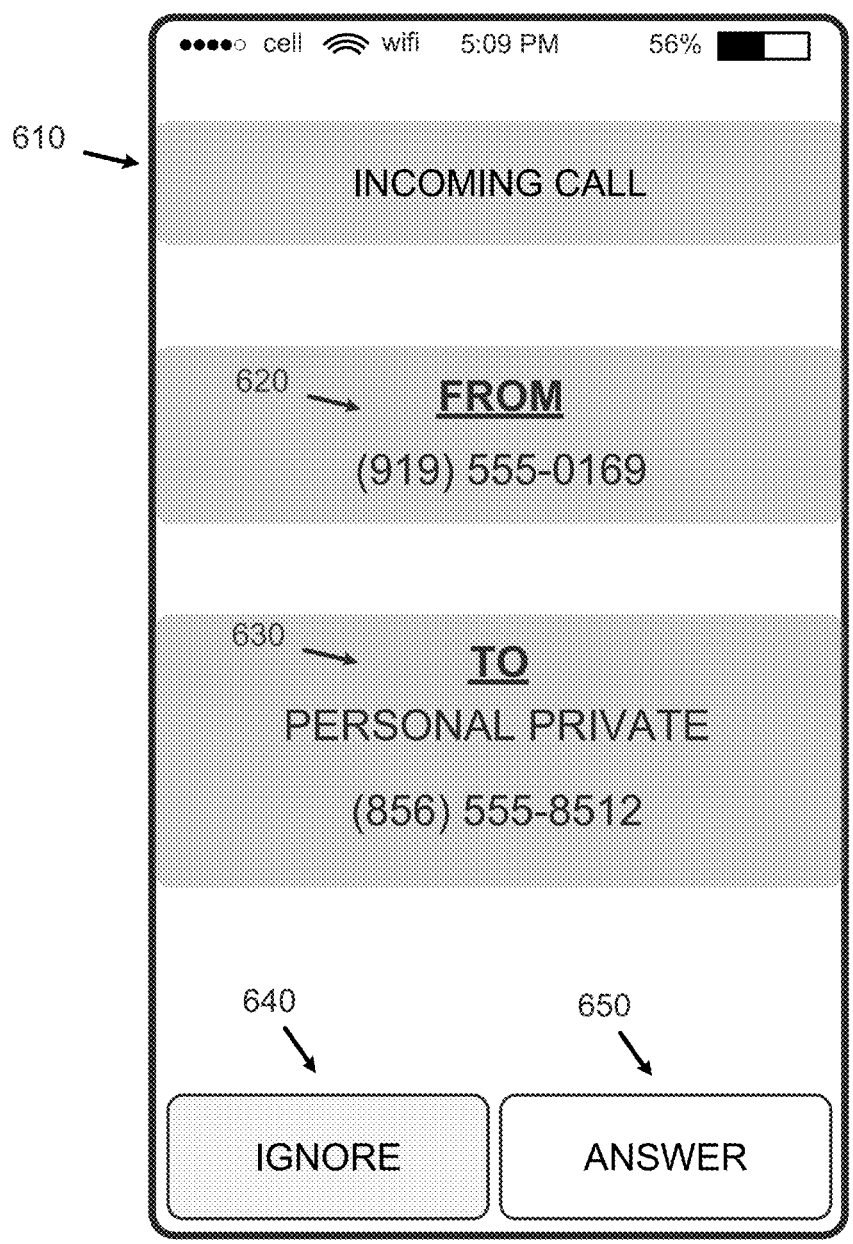
FIG. 6 illustrates an example screen shot of an incoming call user interface of a mobile phone according to an embodiment of the invention.

FIG. 6 illustrates an example screen shot of an incoming call user interface of a mobile phone according to an embodiment of the invention. While not illustrated in the black and white illustration of FIG. 6, the user's incoming call screen may be color coded to be associated with a particular label/outbound telephone number. In this example, the information associated with "Incoming Call" 610, Caller ID 620, and number dialed 630 may be color coded based on the number dialed. For instance, calls incoming to the "Personal Private" telephone number may be visually highlighted in red while incoming calls to "Work Internal" may be visually highlighted in blue and so on for other labels associated with other outbound telephone numbers. Standard 'buttons' for ignoring 640 or answering 650 a call may also be included.

Figure 7:
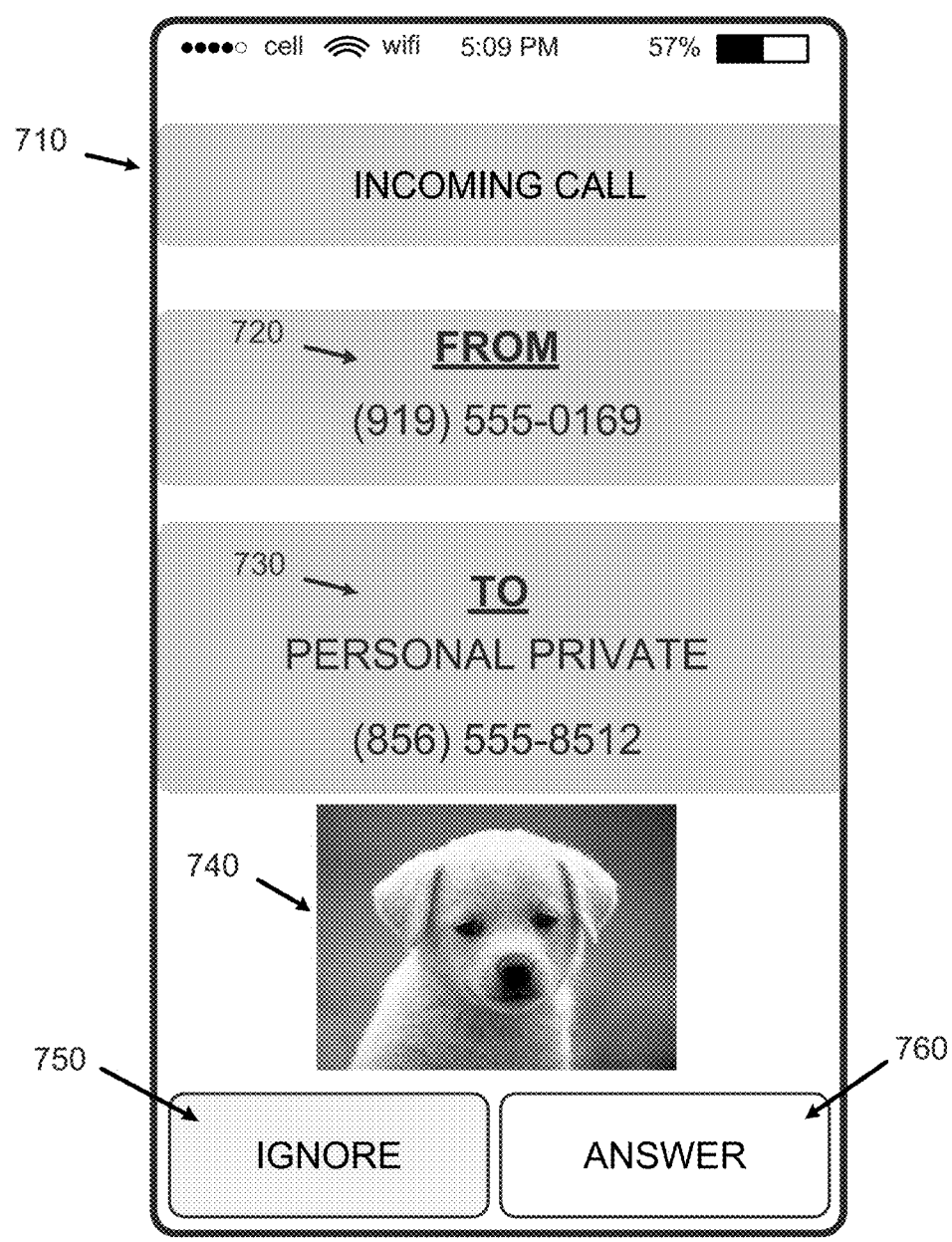
FIG. 7 illustrates an example screen shot of an incoming call user interface of a mobile phone according to another embodiment of the invention.

FIG. 7 illustrates an example screen shot of an incoming call user interface of a mobile phone according to another embodiment of the invention. Other visual cues associated with a particular label may be used in conjunction with or in lieu of color. For instance, certain images may be associated with a label that provides the user a context consistent with the label. A label's associated image may also appear on the incoming call screen. In this example, the typical relevant information is still shown just as in FIG. 6. This includes "Incoming Call" 710, Caller ID 720, number dialed 730, as well as standard 'buttons' for ignoring 750 or answering 760 a call. Added to this screenshot 700 is an image 740 that is associated with the label "Personal Private". In this case the image 740 is of a puppy. Whenever the user interface associated with receiving or answering a call is executed, a particular image chosen and changeable by the user is also presented giving the user an instant visual cue as to the type of caller.

Similarly, incoming calls may have different ringtones based on the particular label/outbound telephone number. These visual and audio cues further allow the user to gain context of an incoming call without having to mentally process the actual Caller ID telephone number of the caller.

FIG. 8 illustrates another example screen shot of a contacts user interface of a mobile phone according to an embodiment of the invention. Just as in FIG. 1, a typical top row of persistent information is provided to the user of a mobile device including cellular and wifi (e.g., 802.11) signal strength, time, and remaining battery level. Just below the persistent information data is a contacts search line 805 that invites the user to search for a specific contact. The remainder of the screen shot 800 is occupied by a listing (alphabetical in this example) of contacts 810*a-d*. The name for each contact is shown on the first line for that contact. The next three lines include telephone and/or other (e.g., Skype ID) contact information for each contact along with a particular outbound telephone number or other ID. For instance, contact 810*a* displays the name "Adams, Mark" on the first line. The second line includes a home telephone number (919) 555-6914 for the contact and a corresponding outbound telephone number. In this instance, the outbound telephone number is (919) 555-0037. Moreover, the outbound telephone number has been further associated with a label—"Personal Public". The next line includes a work telephone number (919) 555-3427 for the contact and a corresponding outbound telephone number of (919) 555-7586 labeled "Work Internal". The next line includes a cell telephone number (919) 555-9897 for the contact and a corresponding outbound telephone number of (919) 555-8512 labeled "Personal Private". The last line includes a Skype ID of "mark5468" for the contact and a corresponding outbound Skype ID of shane3477.

Below the telephone contact information is address information. In this case a home and work address has been associated with this contact. The address information may be used in another embodiment to select a particular outbound telephone number.

Similar explanations may be presented for contact entries 810*b-d*. The specific layout of screen shot 800 is illustrative. One of ordinary skill in the art could re-arrange the components shown in the screen shot 800 of FIG. 8 without altering the functionality represented by the screen shot 800.

FIG. 9 illustrates a third logic flow diagram according to an embodiment of the invention. Logic flow 900 may also be representative of some or all of the operations executed by one or more logic, features, or devices described herein, such as any devices, systems, methods and/or techniques described above with references to FIG. 8 for example. More particularly, logic flow 900 may be implemented by logic of a mobile device, computer soft client, and/or call server in some embodiments. In various embodiments, the logic flow 900 may be representative of some or all of the operations associated with receiving and/or placing a telephone call or SMS text/MMS messages between two end users. Other embodiments are described and claimed.

FIG. 9A illustrates a fourth logic flow diagram 900 according to an embodiment of the invention. The logic flow 900 may be implementable by a mobile device and/or computer soft client capable of telephony communications over one or more networks (e.g., packet based or cellular). The mobile device and/or computer soft client includes requisite computer processor(s) capable of executing software representing a user interface for incoming and outgoing telephone calls and SMS text/MMS messages. In this logic flow 900, a user interface may be opened at block 910 for purposes of executing a contact management process to place a telephone call. From this user interface, a contact may be selected at block 920. Upon selection of a contact at block 920, a process may determine a location associated with that contact at block 930. For example, the location may be determined by parsing the contact address information as described in FIG. 8. The location information need not be as accurate as the exact street address because the purpose of determining the location of the contact is to assist in selecting a most relevant outbound telephone number to associate with the call as determined by the area code of the outbound telephone number. The area served by the North American Numbering Plan (NANP) is divided into smaller Numbering Plan Areas (NPAs), each identified by a three-digit NPA code, commonly called an area code. For example, the zip code and/or city listed for the contact may be associated with a particular area code (NPA). Another method of determining location is to parse the area code directly from the contact information. If there is a matching area code for an outbound telephone number based on the determination at block 930, the user may then select or the logic flow 900 may automatically associate the appropriate outbound telephone number based on location similarity at block 940. Upon selection of an outbound telephone number, the logic flow 900 may receive dial input in the form of a soft key or touchscreen activation of an area designated as a dial button at block 940. The logic flow 900 may then dial the destination contact number using the selected outbound telephone number at block 950.

Figure 9B:
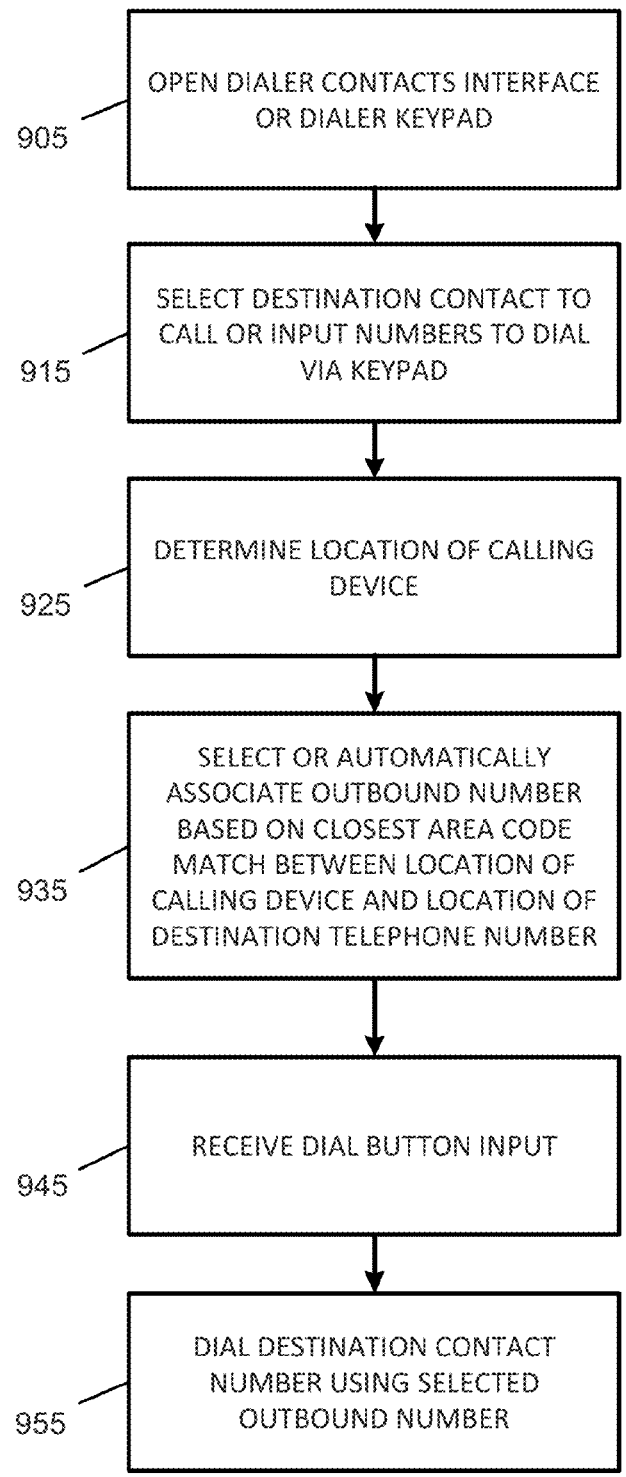
FIG. 9B illustrates a fourth logic flow diagram according to an embodiment of the invention.

FIG. 9B illustrates a fourth logic flow diagram 902 according to an embodiment of the invention. The logic flow 902 may be implementable by a mobile device and/or computer soft client capable of telephony communications over one or more networks (e.g., packet based or cellular). The mobile device and/or computer soft client includes requisite computer processor(s) capable of executing software representing a user interface for incoming and outgoing telephone calls and SMS text/MMS messages. In this logic flow 902, a user interface may be opened at block 905 for purposes of executing a contact management process to place a telephone call. The user interface may be representative of a contacts list or a dialer keypad. From this user interface, a contact may be selected or a telephone number dialed at block 915. Upon selection of a contact or dialing of a telephone number at block 915, a process may determine a location associated with the calling device at block 925. The location may be determined via GPS data, known network access point data, or cellular basestation address data. This location information need not be as accurate as the exact street address because the purpose of determining the calling device location is to assist in selecting a most relevant outbound telephone number to associate with the call. The user may then select or the logic flow 900 may automatically associate the appropriate outbound telephone number based on the closest location similarity between an outbound telephone number area code and the destination telephone number area code at block 935. Upon selection of an outbound telephone number, the logic flow 902 may receive dial input in the form of a soft key or touchscreen activation of an area designated as a dial button at block 945. The logic flow 902 may then dial the destination contact number using the selected outbound telephone number at block 955.

Figure 10:
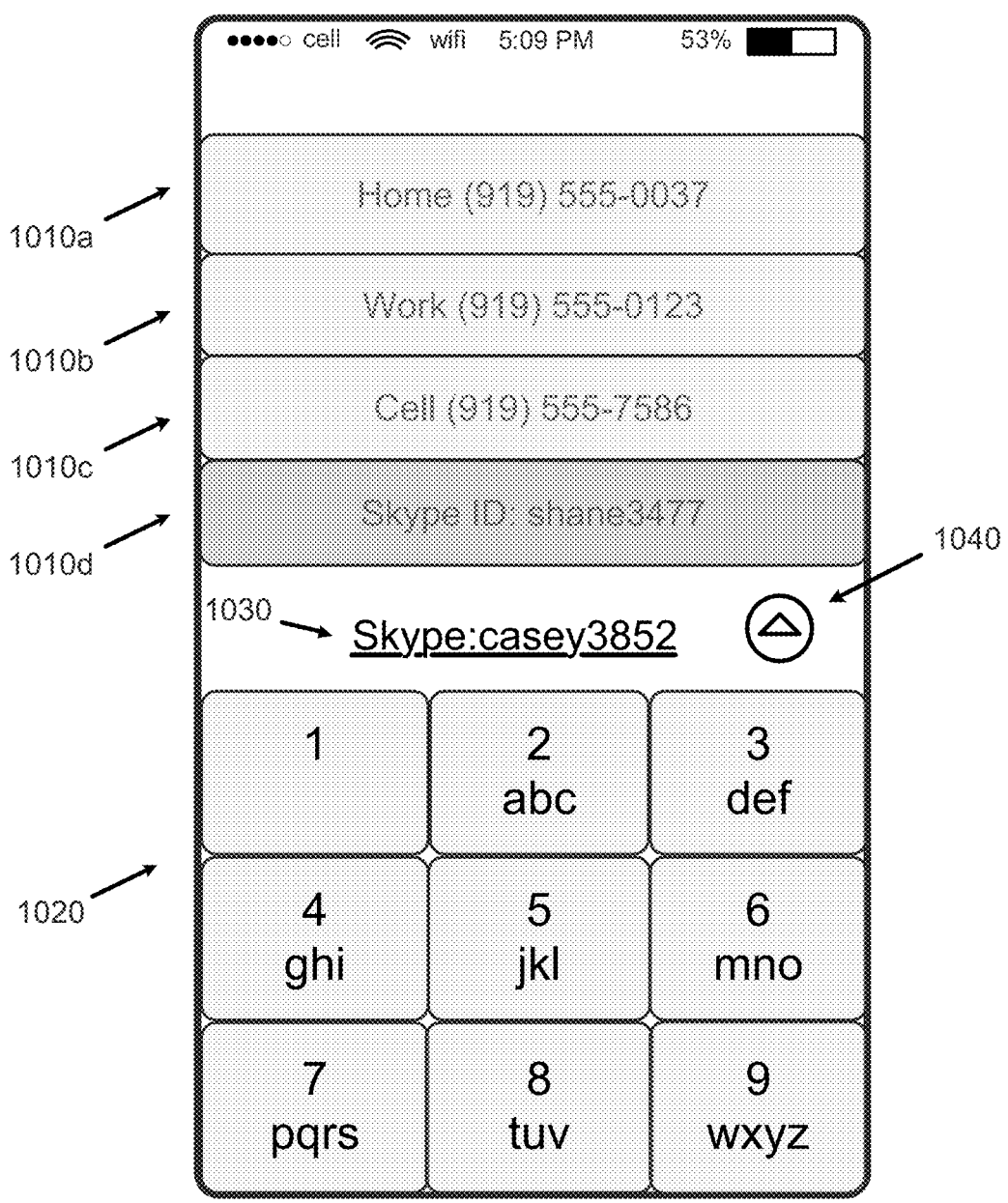
FIG. 10 illustrates a dialer user interface of a mobile phone according to an embodiment of the invention.

FIG. 10 illustrates a dialer user interface of a mobile phone according to an embodiment of the invention. In this embodiment, a typical top row of persistent information is provided to the user of a mobile device including cellular and wifi (e.g., 802.11) signal strength, time, and remaining battery level. The next four (4) lines illustrate that user's outbound telephone numbers and/or other communication service identifiers (e.g., Skype) 1010a-d associated with the device and/or application executing on the device. In this example, the user has three (3) separate telephone numbers and a Skype ID all manageable under a single contact management application. These outbound telephone numbers and Skype ID include (i) a home telephone number of (919) 555-0037, (ii) a work telephone number of (919) 555-0123, (iii) a cellular telephone number of (919) 555-7586, and (iv) a Skype ID of "shane3477". The home telephone number may be reserved for or given out to people generally that are not associated with work. The work telephone number may be reserved for or given out to people associated with the user's work. The cellular telephone number may be reserved for or given out to friends/family. Lastly, the Skype ID may be reserved for or given out to a smaller group of friends and/or family. The number of telephone numbers and other identifiers and their associated labels are illustrative only and should not be considered as limiting the embodiments of the invention in any way. The labels may include a default set provided by the contact management application developer such as, for instance, home, work, cell and may further include an ability to allow a user to create his/her own labels. One of ordinary skill in the art could readily devise different labels for the telephone numbers as well as have more or less telephone numbers.

Below the listing of outbound telephone numbers and other identifiers 1010a-d is a typical numeric keypad 1020 that may be used to dial a desired number for an outbound call or other mode of communication (e.g., video chat). Just above the keypad 1020 is an information line that illustrates the number dialed or identifier selected 1030. In this case, the identifier selected 1030 is a Skype ID "casey3852". Just to the right of the identifier selected 1030 is a call button 1040. The call button 1040 is engaged by the user to initiate a communication session with the identifier selected 1030—in this case a Skype video chat from shane3477 to casey3852. Prior to initiating Skype session, the user may select his Skype ID 1010d to be used as the calling party identifier. The user may engage with this interface via typical touch screen technology well known in the art. Selecting the Skype ID may initiate a Skype application resident on the mobile device or computer that will handle the actual communication session. Additionally, the specific layout of screen shot 1000 is illustrative. One of ordinary skill in the art could re-arrange the components shown in the screen shot 1000 of FIG. 10 without altering the functionality represented by the screen shot 1000.

FIG. 11 illustrates a fourth logic flow diagram according to an embodiment of the invention. Logic flow 1100 may be implemented by logic of a mobile device, computer soft client, and/or call server in some embodiments. In various embodiments, the logic flow 1100 may be representative of some or all of the operations associated with receiving a telephone call or SMS text/MMS message. Other embodiments are described and claimed.

FIG. 11 illustrates a second logic flow diagram 1100 according to an embodiment of the invention. The logic flow 1100 may be implementable by a mobile device and/or computer soft client capable of telephony communications over one or more networks (e.g., packet based or cellular). The mobile device and/or computer soft client includes requisite computer processor(s) capable of executing software representing a user interface for incoming telephone calls and SMS text/MMS messages. In this logic flow 1100, a mobile device or soft client may receive a telephone call at block 910. The telephone call may either be answered or not answered at block 1120. Either way, the incoming telephone call may be stored in the mobile device or soft client call history. The incoming call was directed to a particular telephone number associated with the mobile device or soft client. This telephone number is determined at block 1130 through typical telecommunication processing means. Once determined, the telephone number of the user is associated with the caller ID telephone number of the caller in the call history log at block 1140. Thereafter, the user may initiate a return call from the call history log automatically using the associated outbound telephone number determined above.

It should be noted that the labels and any associated visual and/or audio cues are linked with the outbound telephone number not any other information pertaining to the contact.

While the description above has been described with respect to incoming and outgoing telephone calls, the principles and concepts are equally applicable to short message service (SMS) text messaging and multi-media message service (MMS) exchanges, video chats and text chats. For example, incoming SMS text messages may be associated with a particular outbound telephone number such that replies may be sent using the associated outbound telephone number while an incoming chat request (video or text) may be associated with one or more other communication identifiers (e.g., Skype, Facebook, etc.).

Thus, a telephone call may be considered one of many types of communication means. Other communications means may include SMS/MMS messaging, video chats, and text chats. Each communication means may be initiated with a communications request using one or more communication identifiers. A communication identifier may be a telephone number, a social media identifier (e.g., Facebook, Twitter, Instagram, etc.), and/or a chat identifier (e.g., Skype, Google Hangouts, etc.). Moreover, to the extent the communication means can communicate across platforms, a user may use a chat identifier such as a Skype ID to place a telephone call or a social media ID such as a Twitter ID to send a text message. The permutations are only dependent on the number of different identifiers and their ability to communicate across multiple platforms.

In addition, the description above has been in terms of an end user device comprising a mobile phone. One of ordinary skill in the art, however, would readily appreciate that other types of end user devices may implement the outbound calling and contact management techniques described. For instance, an end user device may comprise a computer device (with display) executing a 'soft' phone/messaging client. This could be a tablet computer, a personal computer (PC), and/or a laptop computer, among other devices.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. At least one non-transitory machine-readable medium comprising a set of instructions that in response to being executed on a mobile communications device associated with multiple telephone numbers, cause the mobile communications device to:
   receive an inbound telephone call, the inbound telephone call including (i) information comprising a calling telephone number for the device making the inbound telephone call, and (ii) a called telephone number, the called telephone number being one of the multiple telephone numbers associated with the mobile communications device; and
   associate the calling telephone number with the called telephone number such that a subsequent outbound telephone call to the calling telephone number automatically uses the called telephone number as the source of the subsequent outbound telephone call.

2. The at least one non-transitory machine-readable medium of claim 1, further comprising instructions that in response to being executed on the mobile communications device cause the mobile communications device to:
   determine whether the calling number is associated with at least one telephone number for a contact in a contacts database associated with the mobile communications device;
   when the calling number is in the contacts database, determine whether the calling number is associated with an outbound telephone number for the mobile communications device; and
   if there is no associated outbound telephone number for the calling number,
   associate the called number as the outbound telephone number for that calling number for the contact in the contacts database.

3. The at least one non-transitory machine-readable medium of claim 1, further comprising instructions that in response to being executed on the mobile communications device cause the mobile communications device to:
   determine whether the calling number for the inbound telephone call is associated with at least one telephone number for a contact in a contacts database associated with the mobile communications device; and
   when the calling number for the inbound telephone call is not associated with at least one telephone number for a contact in the contacts database, adding a new contact to the contacts database, the new contact including the calling number and an associated outbound telephone number comprised of the called number.

4. An apparatus, comprising:
a processor component associated with multiple telephone numbers; and
logic to be executed by the processor component to:
receive an inbound telephone call, the inbound telephone call including (i) information comprising a calling telephone number for the device making the inbound telephone call, and (ii) a called telephone number, the called telephone number being one of the multiple telephone numbers; and
associate the calling telephone number with the called telephone number such that a subsequent outbound telephone call to the calling telephone number automatically uses the called telephone number as the source of the subsequent outbound telephone call.

5. The apparatus of claim 4, the logic to be executed by the processor component to:
determine whether the calling number is associated with at least one telephone number for a contact in a contacts database associated with the processor component;
when the calling number is in the contacts database, determine whether the calling number is associated with an outbound telephone number for the processor component; and
if there is no associated outbound telephone number for the calling number,
associate the called number as the outbound telephone number for that calling number for the contact in the contacts database.

6. The apparatus of claim 4, the logic to be executed by the processor component to:
determine whether the calling number for the inbound telephone call is associated with at least one telephone number for a contact in a contacts database associated with the processor component; and
when the calling number for the inbound telephone call is not associated with at least one telephone number for a contact in the contacts database, adding a new contact to the contacts database, the new contact including the calling number and an associated outbound telephone number comprised of the called number.

7. A computer implemented method, comprising:
receiving an inbound telephone call, the inbound telephone call including (i) information comprising a calling telephone number for the device making the inbound telephone call, and (ii) a called telephone number, the called telephone number being one of the multiple telephone numbers associated with a mobile communications device; and
associating the calling telephone number with the called telephone number such that a subsequent outbound telephone call to the calling telephone number automatically uses the called telephone number as the source of the subsequent outbound telephone call.

8. The computer implemented method of claim 7, comprising:
determining whether the calling number is associated with at least one telephone number for a contact in a contacts database associated with the mobile communications device;
when the calling number is in the contacts database, determining whether the calling number is associated with an outbound telephone number for the mobile communications device; and
if there is no associated outbound telephone number for the calling number,
associating the called number as the outbound telephone number for that calling number for the contact in the contacts database.

9. The computer implemented method of claim 7, comprising:
determining whether the calling number for the inbound telephone call is associated with at least one telephone number for a contact in a contacts database associated with the mobile communications device; and
when the calling number for the inbound telephone call is not associated with at least one telephone number for a contact in the contacts database, adding a new contact to the contacts database, the new contact including the calling number and an associated outbound telephone number comprised of the called number.

* * * * *